(12) United States Patent
Bakran et al.

(10) Patent No.: US 6,930,899 B2
(45) Date of Patent: Aug. 16, 2005

(54) N-POINT-CONVERTER CIRCUIT

(75) Inventors: Mark-Matthias Bakran, Herzogenaurach (DE); Martin Neeser, Erlangen (DE); Georg Zaiser, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 43 days.

(21) Appl. No.: 10/696,008

(22) Filed: Oct. 29, 2003

(65) Prior Publication Data

US 2004/0095790 A1 May 20, 2004

Related U.S. Application Data

(63) Continuation of application No. PCT/DE02/02224, filed on Jun. 19, 2002.

(30) Foreign Application Priority Data

Jul. 2, 2001 (DE) ........................................ 101 31 961

(51) Int. Cl.$^7$ .......................................... H02M 7/5387
(52) U.S. Cl. ...................................................... 363/132
(58) Field of Search .......................... 363/43, 132, 136, 363/137

(56) References Cited

U.S. PATENT DOCUMENTS

| | | | | |
|---|---|---|---|---|
| 4,670,828 A | | 6/1987 | Shekhawat et al. | ............ 363/56 |
| 5,684,688 A | * | 11/1997 | Rouaud et al. | ............. 363/132 |
| 5,949,669 A | * | 9/1999 | Bruckmann et al. | ........ 363/132 |
| 6,005,787 A | * | 12/1999 | Mizukoshi | ................... 363/71 |
| 6,205,040 B1 | * | 3/2001 | Teichmann | ................... 363/57 |
| 6,278,626 B1 | * | 8/2001 | Teichmann | ................. 363/135 |
| 6,480,403 B1 | * | 11/2002 | Bijlenga | ....................... 363/98 |

FOREIGN PATENT DOCUMENTS

| | | | |
|---|---|---|---|
| JP | 10 108474 A | 4/1998 | ............ H02M/7/48 |
| WO | WO 99/40676 A | 8/1999 | .......... H02M/7/797 |

OTHER PUBLICATIONS

Xiaoming Yuan et al.: "evaluation of soft switching techniques for the neutral–point–clamped (NPC) inverter.", IEEE, Apr. 1999 pp. 659–663, XP010346776, figures 3,5, 7,9.

"Medium Voltage Inverter using High–Voltage IGBTs" by A. Mertens, M. Bruckmann, R. Sommer, published in EPE Dec. 1999—Lausanne.

"The Universal Medium Voltage Adjustable Speed Drive" by Y. Shakweh & E. A. Lewis, published in EPE Dec. 1999—Lausanne.

A New Multilevel Inverter Topology with a Hybrid Approach, by Bum–Seok Suh, Yo–Han Lee, Dong–Seok Hyun and Thomas A. Lipo, published in EPE Dec. 1999—Lausanne.

* cited by examiner

*Primary Examiner*—Jeffrey Sterrett
(74) *Attorney, Agent, or Firm*—Henry M. Feiereisen

(57) ABSTRACT

An n-point-converter circuit with two series-connected power converter valves, each having (n−1) turn-off semiconductor switches, is disclosed. The converter circuit has a voltage intermediate circuit with (n−1) electrically series-connected capacitors. The voltage intermediate circuit is connected in parallel to DC-side terminals of the series-connected power converter valves. At least one AC-side terminal can be connected to one or more of the n potentials of the voltage intermediate circuit by means of (n−2) cross arms, each of which includes at least (n−3) turn-off semiconductor switches. The multipoint converter is easy to implement, has an improved output voltage quality, and possesses an emergency running feature.

6 Claims, 4 Drawing Sheets

N-POINT-CONVERTER CIRCUIT

CROSS-REFERENCES TO RELATED APPLICATIONS

This application is a continuation of prior filed copending PCT International application no. PCT/DE02/02224, filed Jun. 19, 2002, on which priority is claimed under 35 U.S.C. §120, the disclosure of which is hereby incorporated by reference.

This application claims the priority of German Patent Application, Serial No. 101 31 961.4, filed Jul. 2, 2001, pursuant to 35 U.S.C. 119(a)–(d), the disclosure of which is incorporated herein by reference.

BACKGROUND OF THE INVENTION

The present invention relates to an N-point-converter circuit, and more particularly to an N-point-converter circuit with two power converter valves electrically connected in series that offer an improved performance with respect to voltage breakdown.

High-power drives with an adjustable rotation speed utilize not only DC drives, but increasingly three-phase drives with a line-controlled direct inverter and a machine-controlled converter motor. The limited rotation speed range of the direct inverter drive as well as the limited quality of the three-phase torque (expected torque and dynamics) of converter motors have hitherto prevented more widespread applications of three-phase drives which require less maintenance and which are more robust. Although these limitations or disadvantages could be overcome by using U-inverters, the problems associated with a limited power range remained. Commercially available turn-off semiconductor switches have made it now possible to exceed the megawatt limit. Components with 4.5 kV blocking voltage and 3 kA maximum switchable current are now used in practical applications, making possible inverters with a power of up to 2.5 MW while using only six turn-off semiconductor switches.

To increase the power limits further, a transition to a series and/or parallel connection of turn-off semiconductor switches would be required in conventional U-inverter circuits. This could lead to additional technical problems, significantly increased complexity and higher losses, in particular with circuit networks that symmetrize voltage and current.

One alternative could be a decoupled series connection of two rectifier valves akin to the concept used in three-point inverters. This would double the achievable power range, whereby each turn-off semiconductor switch can be fully utilized by providing two additional diodes. In addition, the output voltage has a significantly improved curve form even at a reduced pulse frequency, which increases the efficiency and reduces harmonic content of the current as well as of the torque.

A three-point converter circuit is known from the publication "Medium Voltage Inverter using High-Voltage IGBTs" by A. Mertens, M. Bruckmann, R. Sommer, published in EPE '99—Lausanne. This three-point converter circuit has two series-connected converter valves, each having two turn-off semiconductor switches, and a voltage intermediate circuit with two capacitors that are electrically connected in series. The connection point of two turn-off semiconductor switches of a respective converter valve is electrically connected through a neutral point diode with the connection point of the two capacitors of the voltage intermediate circuit. This connection point forms of the center of the three-point converter circuit. The turn-off semiconductor switches are implemented as Insulated-Gate-Bipolar-Transistors (IGBT). The three-point converter circuit is capable of producing an output voltage of 2.3 kV using 3.3 kV IGBTs. Four semiconductor switches are used in each converter valve to generate an output voltage of 3.3 kV or 4.16 kV. In other words, instead of using turn-off semiconductor switches with the series connection number ONE, semiconductor switches with a series connection number TWO are used, due to their high blocking voltage.

Moreover, the neutral point diodes are replaced by semiconductor switches with the series connection number TWO. Neutral Point Clamped (NPC) three-point converter circuits are commercially available.

This NPC inverter configuration has the following disadvantages:

The neutral point is connected by neutral point diodes. A series connection of the components is required to further increase the operating voltage. The series connection of the diodes is not without problems. As long as an IGBT is connected in parallel with the diode, the voltage at the diode is limited by the active measures of the IGBTs. The neutral point diodes require additional circuitry.

The additional circuit elements of the neutral point diodes add other difficulties. When the inner valves are switched on, the charge from the additional circuit elements is discharged into the free-running circuit, which consists of inner valves and neutral point diodes. These free-running currents increase the load on the valves and make it more difficult to employ the circuit.

The implementation of five-point inverters also requires a series connection of the diodes and additional circuit elements.

The commutation sequence has to be observed even in the event of a failure.

In addition to this NPC inverter configuration, another inverter configurations exists where the neutral point is not clamped. This configuration is referred to as Floating Point (FP). In this FP converter configuration, at least one capacitor is always connected electrically in parallel with two semiconductor switches that are electrically connected in series. The number of the capacitors increases proportionally to the number of the semiconductor switches that are electrically connected in series. I.e., in a five-point converter circuit, ten capacitors are used in the voltage intermediate circuit. The circuit of such five-point converter circuit is known from the publication "The Universal Medium Voltage Adjustable Speed Drive" by Y. Shakweh & E. A. Lewis, published in EPE '99—Lausanne. FIG. 4 in this publication also depicts a five-point converter circuit with an NPC topology. The diagram indicates that 3×4 clamping diodes are used. These diodes can be used to connect the AC side of this five-point converter circuit with the five potentials of the voltage intermediate circuit.

The FP inverter configuration also has disadvantages:

A special control process is required for charging internal capacitors.

A large number of capacitors are required.

The publication "The Universal Medium Voltage Adjustable Speed Drive" by Y. Shakweh & E. A. Lewis, published in EPE '99—Lausanne, describes another possibility for a medium voltage inverter, whereby several so-called H-bridge rectifiers are electrically connected in series. Such circuit is also referred to as a multi-level cascade, but has the following disadvantages:

A supply with a separate potential is required for each H-bridge. This necessitates complex transformers with several windings.

The publication "A New Multilevel Inverter Topology with a Hybrid Approach", by Bum-Seok Suh, Yo-Han Lee, Dong-Seok Hyun and Thomas A. Lipo, published in EPE '99—Lausanne, describes a modified multi-level cascade. This modification enables an even-numbered multipoint topology.

It would therefore be desirable and advantageous to provide a multipoint converter circuit, which obviates prior art shortcomings and can be easily implemented, which has an improved output voltage quality and includes emergency running features.

SUMMARY OF THE INVENTION

According to an aspect of the invention, an n-point-converter circuit includes two converter valves electrically connected in series, wherein each converter valve has (n−1) turn-off semiconductor switches connected in series at corresponding connection points. The n-point-converter circuit further includes a voltage intermediate circuit with (n−1) capacitors electrically connected in series at corresponding capacitor connection points that define a corresponding DC potential, and (n−2) cross arms, each cross arm having at least (n−3) anti-serially connected turn-off semiconductor switches. Free ends of the series-connected converter valves form DC-side terminals of the series-connected power converter valves, wherein the DC-side terminals are connected electrically in parallel with the voltage intermediate circuit. At least one AC-side valve connection point can be connected to at least one of the n potentials of the voltage intermediate circuit by way of the (n 2) cross arms.

In the event of a failure within the multipoint converter circuit, the converter valves connected in series are switched off and the turn-off semiconductor switches of at least one cross arms are switched on. This decreases the voltage on the series-connected converter valves. In a three-point converter circuit, the blocking voltage at the series-connected converter valves is reduced to half the intermediate circuit voltage.

Advantageously, the turn-off semiconductor switches of each converter valve and of each cross arm can be arranged side-by-side in a corresponding compression assembly in such a way that the AC-side or valve connection points and the DC-side or capacitor connection points are each located on a different side of the compression assembly. Since the commutation paths are identical, this allows a quite simple design of a phase module in the form of at least three columns arranged in parallel. The first column includes the turn-off semiconductor switches of the first converter valve, the second column includes the turn-off semiconductor switches of a cross arms, and the third column includes the turn-off semiconductor switches of the second converter valve. If the multipoint converter circuit is equipped with several cross arms, then the number of columns arranged in parallel increases by the number of the additional cross arms. As a result, a multipoint converter circuit with a low inductance can be achieved.

According to another advantageous feature of the multipoint converter circuit, each of the cross arms can connect a DC potential of the voltage intermediate circuit with a corresponding AC-side connection point of the series-connected converter valves. In this way, (n−1) turn-off semiconductor switches always conduct a current, whereby n is equal to the number of the DC potentials of the intermediate voltage circuits. This reduces the number of the required turn-off semiconductor switches of the multipoint converter circuit, although the individual turn-off semiconductor circuits may disadvantageously each carry a different load.

According to another advantageous feature of the multipoint converter circuit, all cross arms can be connected between an AC-side terminal of the series-connected converter valves, such as a load terminal, and a potential of the voltage intermediate circuit. In this way, all turn-off semiconductor switches of the multipoint converter circuit carry the same load.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
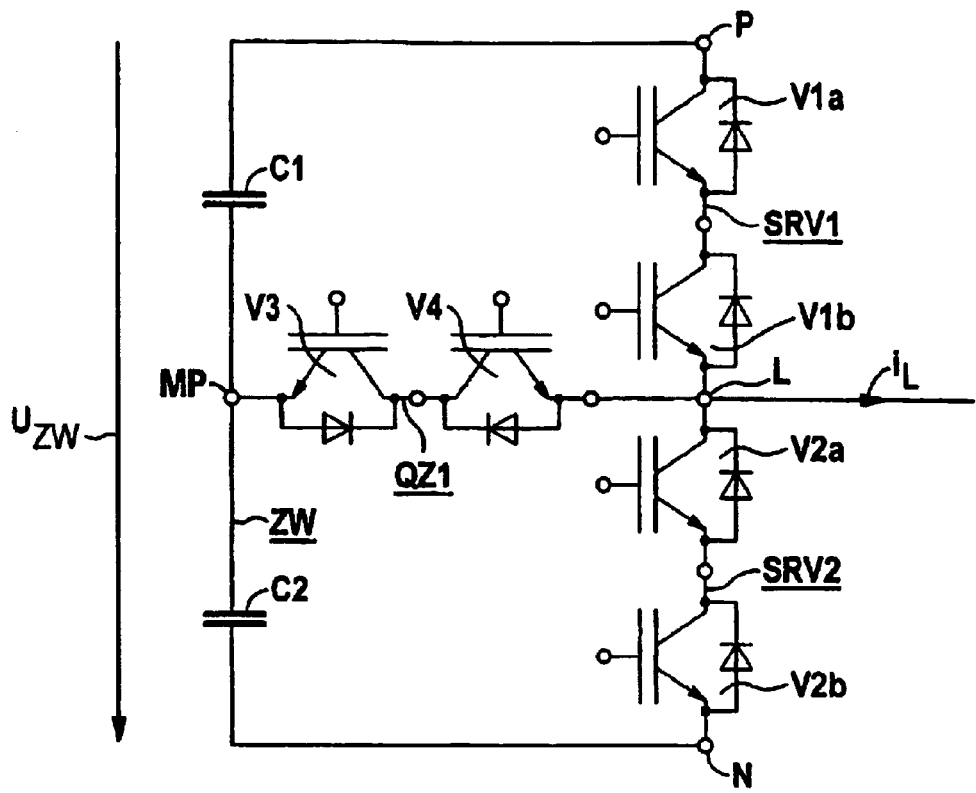
FIG. 1 shows a three-point converter circuit according to the invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown in detail a three-point converter circuit according to the invention. A three-point converter circuit includes two converter valves SRV1 and SRV2, each of which has two turn-off semiconductor switches V1$a$ and V1$b$, and V2$a$ and V2$b$, respectively. The two converter valves SRV1 and SRV2 are electrically connected in series, whereby their connection point represents a load terminal L of the three-point converter circuit. The free end of the converter valve SRV1 forms a positive DC terminal P, whereas the free end of the converter valve SRV2 forms a negative DC terminal N. A voltage intermediate circuit ZW, which in a three-point converter circuit has two capacitors C1 and C2 that are electrically connected in series, is electrically connected in parallel with the terminals P and N. The connection point of the capacitors C1 and C2 forms a neutral point terminal MP.

According to the invention, the AC-side load terminal L can be connected by a cross arm QZ1 with the neutral point terminal MP. The cross arm QZ1 includes two turn-off semiconductor switches V3 and V4 which are connected anti-serially. The anti-serial connection of the two turn-off semiconductor switches V3 and V4 allows a current to flow back and forth between the neutral point terminal MP and the load terminal L. Either the turn-off semiconductor switch V4 or the turn-off semiconductor switch V3 is controlled to be conducting.

The turn-off semiconductor switches V1a, V1b, V2a, V2b, V3 and V4 in the depicted exemplary embodiment can be implemented as Insulated Gate Bipolar Transistors (IGBT), with a reverse-biased diode connected in parallel. Other semiconductor switches can be used instead of IGBTs. These must be turn-off and also include an antiparallel diode. Suitable semiconductor switches can be selected based, on one hand, on the DC voltage $U_{ZW}$ of the voltage intermediate circuit ZW and, the other hand, on the DC current $i_L$.

A converter circuit of this type is also referred to as bridge arm or phase module. Three converter circuits of the type depicted in FIG. 1, which are electrically connected in parallel on the DC side, are required to construct a three-phase, three-point converter circuit. For this reason, the capacitance value of the voltage intermediate circuit ZW of a three-phase configuration can be distributed over the three voltage intermediate circuits ZW.

Figure 2:
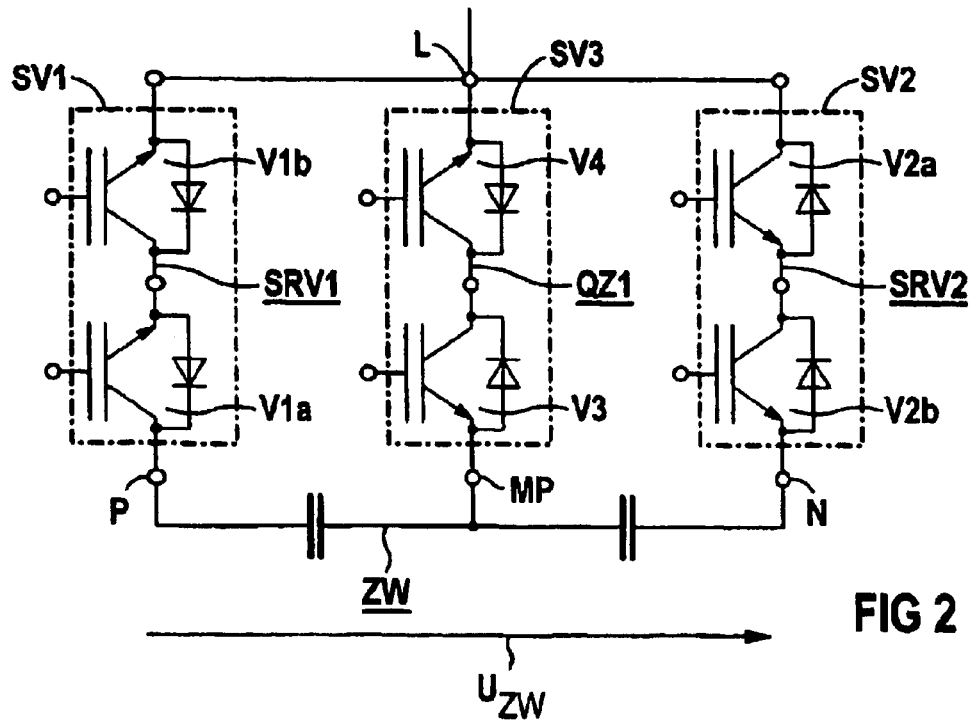
FIG. 2 shows a corresponding mechanical configuration of a three-point converter circuit.

FIG. 2 shows in detail the mechanical configuration of the three-point converter circuit of FIG. 1. In this configuration, the turn-off semiconductor switches V1a, V1b, and V2a, V2b of the converter valves SRV1 and SRV2 are arranged in the form of a compression assembly. The three compression assemblies SV1, SV2 and SV3 are physically aligned in parallel to each other, since the individual turn-off semiconductor switches have identical commutation paths. This arrangement of several parallel compression assemblies suggests that disk-shaped semiconductor switches could advantageously be used, whereby the compression assemblies SV1, SV2 and SV3 are aligned in the longitudinal direction in such way that the connection point of the three converter arms that forms the load terminal L is located on one side of the parallel arrangement of the compression assemblies SV1, SV2 and SV3. The capacitors C1 and C2 of the voltage intermediate circuits ZW can then be electrically connected to the terminals of the three compression assemblies SV1, SV2 and SV3 that are located on the opposite side of the parallel arrangement.

Figure 3:
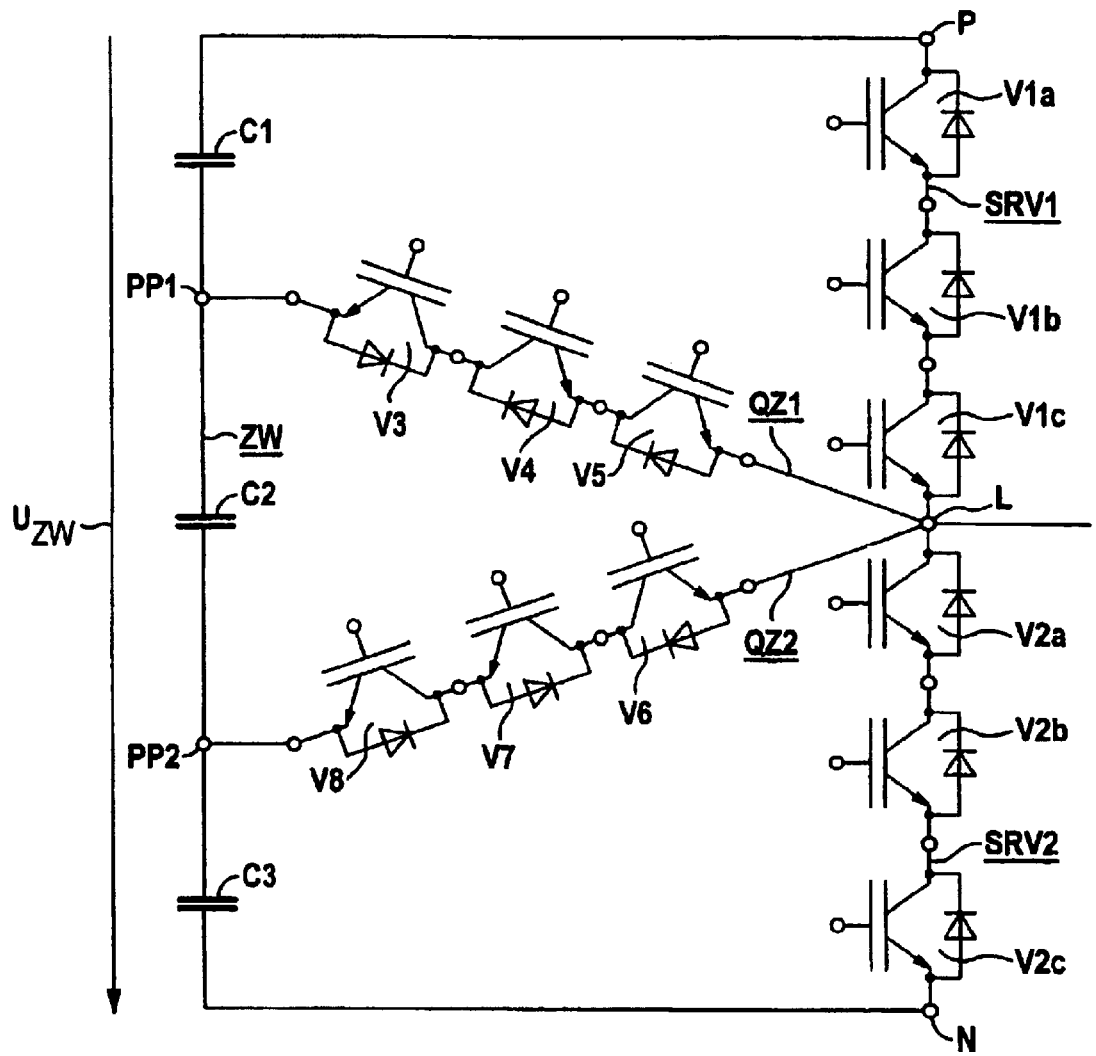
FIG. 3 shows a first embodiment of a four-point converter circuit according to the invention.

FIG. 3 shows a first embodiment of a four-point converter circuit. The four-point converter circuit is different from the three-point converter circuit of FIG. 2 in that the converter valves SRV1 and SRV2 each have a third turn-off semiconductor switch V1c and V2c, respectively. An additional second cross arm QZ2 is provided, whereby the two cross arms QZ1 and QZ2 each include three turn-off semiconductor switches V3, V4, V5, and V6, V7, V8, respectively. The voltage intermediate circuit also includes a third capacitor C3. Accordingly, the DC voltage $U_{ZW}$ of the voltage intermediate circuit ZW is subdivided into four potential levels. These potential levels are the potentials are the positive and negative DC terminal P and N, the potential of the connecting point PP1 of the series-connected capacitors C1 and C2 and the potential of the connecting point PP2 of the series-connected capacitors C2 and C3. Each of the connecting points PP1 and PP2 can be connected by way of a corresponding cross arm QZ1 and QZ2, respectively, to the load terminal L of the four-point converter circuit. The turn-off semiconductor switches V3, V4, V5, and V6, V7, V8, respectively, of the two corresponding cross arms QZ1 and QZ2 are each electrically connected in series so that in each of the cross arms QZ1 and QZ2 a current can flow in either direction.

If a five-point converter circuit were required instead of a four-point converter circuit, then the number of the turn-off semiconductor switches would increase by one for each additional converter valve SRV. The number of cross arms QZ and the number of turn-off semiconductor switches of the cross arms would also increase by one, likewise the number of capacitors C of the voltage intermediate circuit ZW. I.e., when the number of points of a multipoint converter circuit is increased, not only does the number of turn-off semiconductor switches in the compression assemblies SV1, SV2, SV3, . . . , increase, but also the number of the cross arms QZ1, QZ2, QZ3, . . . Accordingly, a new compression assembly is added to the existing arrangement. This modified configuration of a multipoint converter circuit has the advantage that an identical voltage load is applied to all turn-off semiconductor switches of the converter valves SRV1, SRV2, . . . , and the cross arms QZ1, QZ2, . . . .

Advantageously, this embodiment of a multipoint converter circuit also improves the availability for the converter circuit itself and/or of the converter using the converter circuit. The availability of the converter circuit is improved because the semiconductor switches V3 and V4 of the cross arm QZ1 are switched on and the valves V of the malfunctioning converter valves SRV are switched off in the event of a failure of a turn-off semiconductor switch V in a converter valve SRV in a three-point converter configuration. The load terminal L is then connected with the neutral point terminal MP of the three-point converter circuit, with half the intermediate circuit voltage $U_{ZW}$ applied across the semiconductor switches V of the converter valves SRV, which the turn-off semiconductor switches V1a, V1b, V2a and V2b can easily block.

It is hence no longer necessary to stop the converter circuit when a semiconductor switch V in a converter valve SRV breaks down. The damaged turn-off semiconductor valve V can still switch the current with only one functioning turn-off semiconductor switch. For example, if the semiconductor switch V1a of the converter valve SRV1 breaks down, then the converter valve SRV2 must not be switched on after the failure is identified, since otherwise the functioning semiconductor switch V1b in the converter valve SRV1 would have to block an excessively high voltage. The semiconductor valve V1b can still be switched together with the turn-off semiconductor switch V3 of the cross arm QZ1.

In order to maintain symmetry in the output current and the output voltage of the three-phase inverter, all phase modules of this three-phase inverter have to operate in the same switching mode. In other words, in all phases switching only occurs only between the upper converter valve SRV1 and the semiconductor switch V3 of the cross arm QZ1. As a result, this three-phase inverter operates like a two-point inverter with half the intermediate circuit voltage $U_{ZW}$ and is able to transfer the nominal current and half the output voltage to a connected load. The applications can therefore still be operated with a constant torque.

The converter configuration according to the invention, wherein the load terminal L is connected directly wit the neutral point terminal MP and the turn-off semiconductor switches V are connected in series has the following advantages:

All commutation paths in the inverter are identical, and the load of the turn-off semiconductor valves also remains the same. This allows a modular design.

No complex circuitry is required, no additional control and no identification of a zero-current. The output voltage has steps, like in a conventional three-point converter circuit.

The circuitry is difficult to implement in an NPC converter with neutral point valves. A freewheeling circuit exists as a result of the circular connection of the neutral point valves, when a neutral point is added. If the neutral point valves are implemented with circuitry for decreasing the turn-on and turn-off load, then freewheeling currents can be introduced in the neutral circuit during switching which increases the load on the neutral point valves. The direct connection according to the invention eliminates the freewheeling circuit, which simplifies the circuitry.

Because the converter valve has a larger number of turn-off semiconductor valves connected in series, the entire converter valve does no longer fail automatically when one turn-off semiconductor switch fails, because the voltage can be distributed from one turn-off semiconductor switch to two other turn-off semiconductor switches. The switching processes can still be performed at half the intermediate circuit voltage. The converter circuit can continue to control a load at reduced output power, but with full torque.

In this multipoint converter circuit according to the invention, the increased number of turn-off semiconductor switches as compared to a conventional NPC converter circuit with neutral point diodes could pose a problem. However, this problem can be eliminated by another embodiment of the N-point converter circuit according to the invention.

Figure 4:
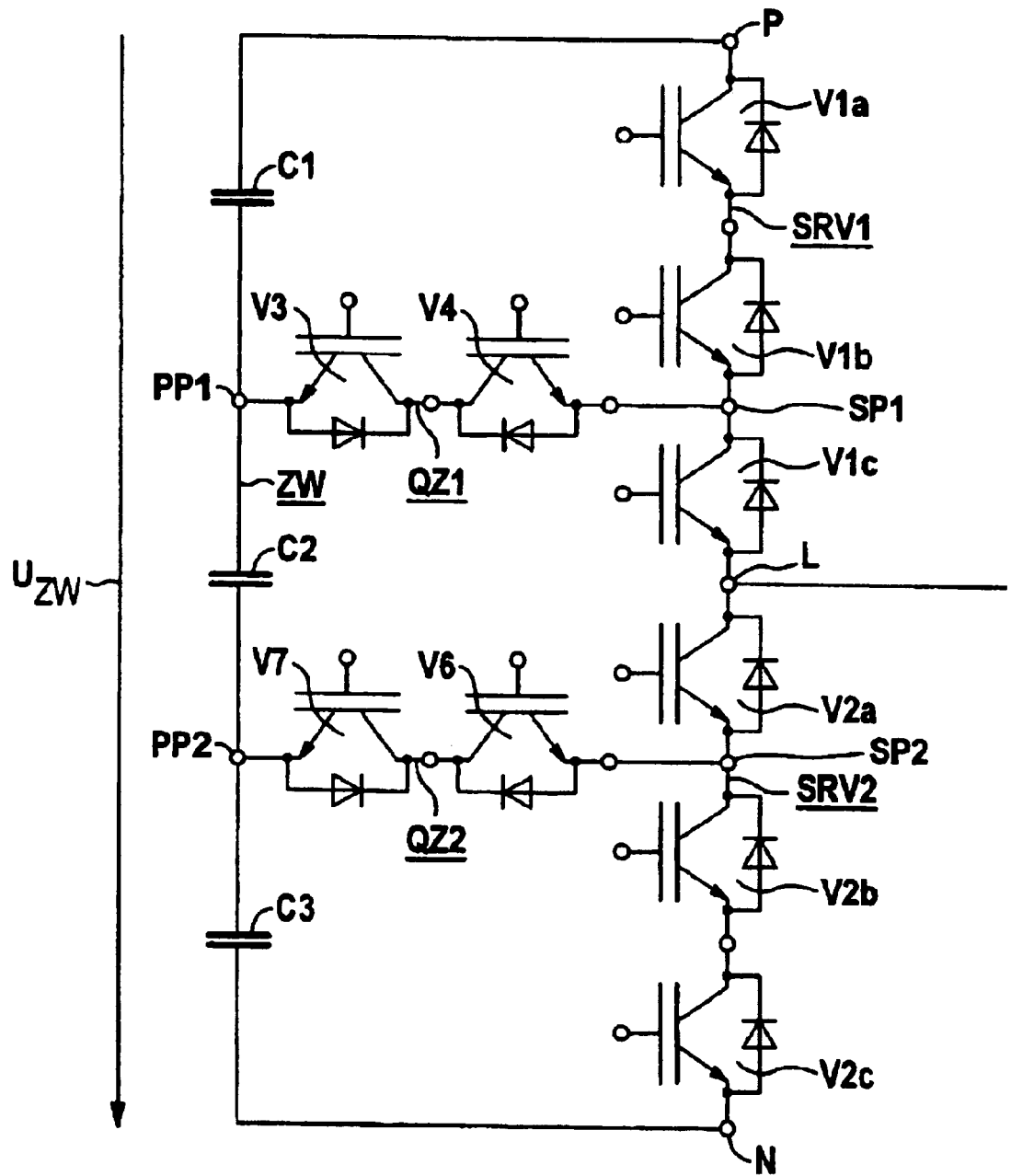
FIG. 4 shows a second embodiment of a four-point converter circuit according to the invention.

FIG. 4 shows schematically a second embodiment of the four-point converter circuit according to the invention. This embodiment is different from the embodiment of FIG. 3 in that each of the existing cross arms QZ1, QZ2 has only two turn-off semiconductor switches V3, V4, and V6, V7, respectively. Moreover, the cross arms QZ1 and QZ2 no longer connect the potentials of the connection points PP1 and PP2 of the voltage intermediate circuit ZW with the load terminal L of the converter circuit, but instead with two points SP1 and SP2. The point SP1 is a connection point of the two turn-off semiconductor switches V1$b$, V1$c$ of the converter valve SRV1, whereas the point SP2 is a connection point of the two turn-off semiconductor switches V2$a$ and V2$b$ of the converter valve SRV2. This connection configuration of the two cross arms QZ1 and QZ2 reduces the number of turn-off semiconductor switches V of a multipoint converter circuit. A direct comparison with the embodiment of FIG. 3 shows that two turn-off semiconductor switches V5 and V8 have been eliminated. However, the turn-off semiconductor switches V now carry a different load. The load difference between the converter valves SRV1 and SRV2 is small compared to those of conventional multipoint converter circuits. The reduced number of turn-off semiconductor switches V provides noticeable advantages only when the number of points of the converter circuit becomes large.

Figure 5:
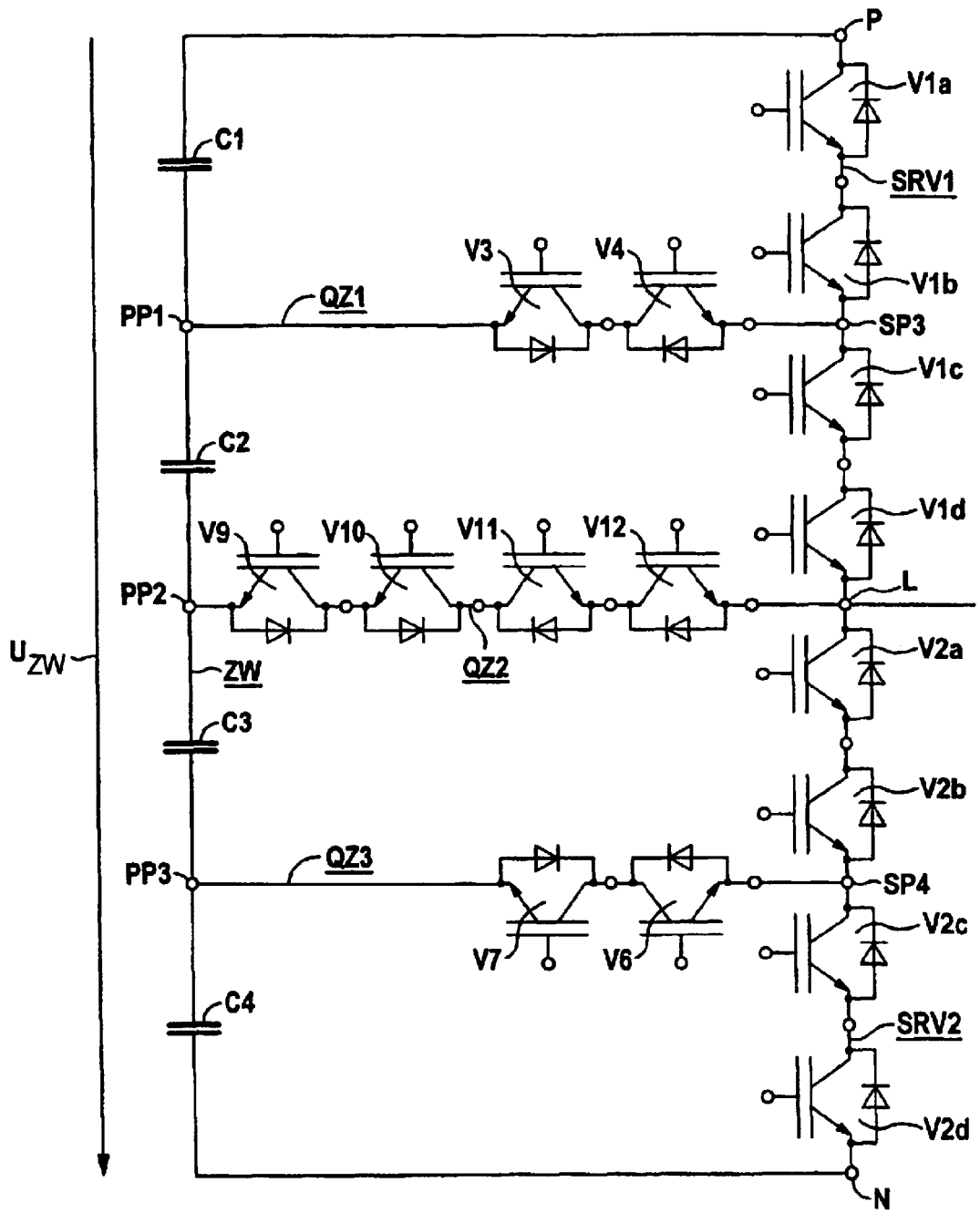
FIG. 5 shows an embodiment of a five-point converter circuit according to the invention.

FIG. 5 depicts a second embodiment of a five-point converter circuit according to the invention. The converter valves SRV1 and SRV2 each have four turn-off semiconductor switches V1$a$ to V1$d$ and V2$a$ to V2$d$. A five-point converter circuit includes three cross arms QZ1, QZ2 and QZ3 which connect the potentials of the connecting points PP1, PP2 and PP3 of the voltage intermediate circuit ZW with the points SP3 and SP4 and with the load terminal L. The point SP3 is a connecting point of the two turn-off semiconductor switches V1$b$ and V1$c$ of the converter valve SRV1, whereas the point SP4 is a connecting point of the two turn-off semiconductor switches V2$b$ and V2$c$ of the converter valve SRV2. Each of the cross arms QZ1 and QZ3 has two turn-off semiconductor switches V3, V4, and V6, V7, respectively, whereas the cross arm QZ2 has four turn-off semiconductor switches V9, . . . , V12. A potential is therefore switched to the voltage intermediate circuit ZW by the same number of the controllable turn-off semiconductor switches V. In a five-point converter circuit according to the first embodiment, the cross arms QZ1, QZ2 and QZ3 would each have four turn-off semiconductor switches V. Accordingly, the number of turn-off semiconductor switches V is reduced by four. The load difference between the turn-off semiconductor switches V is also much less than in conventional multipoint converter circuits. In a four-point or five-point converter circuit, the load of the inner semiconductor switches V1$c$ and V2$a$, or V1$c$, V1$b$, V2$a$, V2$b$, respectively, is the same as that in a three-point converter circuit employing an NCP topology.

The direct connection according to the invention of different potential stages to the load terminal L and/or to different AC-side terminals SP1, SP2, and SP3, SP4, respectively, allows the realization of a system with a larger number of voltage stages, which simplifies the design of a multipoint converter circuit. The greater number of voltage stages also increases the availability of the converter circuit. In addition, the multipoint converter circuit includes an emergency running feature, which can be implemented without requiring additional hardware.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. An n-point-converter circuit, consisting:
    a maximum of two converter valves for each converter phase electrically connected in series at corresponding valve connection points, each converter valve having a maximum of (n−1) turn-off semiconductor switches;
    a voltage intermediate circuit having a maximum of (n−1) capacitors electrically connected in series at corresponding capacitor connection points, each capacitor connection point defining a corresponding DC potential; and
    a maximum of (n−2) cross arms, each cross arm having a maximum of (n−1) semiconductor switches, of which at least two are anti-serially connected, wherein free ends of the series-connected converter valves form DC-side terminals, said DC-side terminals connected electrically in parallel with the voltage intermediate circuit, and
    wherein the (n−2) cross arms connect the valve connection point of each series-connected pair of the converter valves with a corresponding one of the intermediate potentials of the voltage intermediate circuit capacitor connection points.

2. The circuit of claim 1, wherein the turn-off semiconductor switches of each converter valve and of each cross arm are arranged side-by-side in a corresponding compression assembly in such a way that the valve connection points and the capacitor connection points are each located on a different side of the compression assembly.

3. The circuit of claim 1, wherein the turn-off semiconductor switches comprise Insulated Gate Bipolar Transistors (IGBT).

4. An n-point-converter circuit, consisting:
a maximum of two converter valves for each converter phase electrically connected in series and having free ends forming DC-side terminals, each converter valve having a maximum of (n−1) turn-off semiconductor switches and a valve connection point;
a voltage intermediate circuit having a maximum of (n−1) capacitors electrically connected in series at (n−2) corresponding capacitor connection points and connected electrically in parallel with the DC-side terminals, each capacitor connection point defining a corresponding DC potential; and
a maximum of (n−2) cross arms having turn-off cross arm semiconductor switches and connecting one of the (n−2) capacitor connection points with a corresponding one of the valve connection points,
wherein a number of the turn-off cross arm semiconductor switches in a cross arm is selected so that each cross arm that connects a valve connection point with a corresponding intermediate potential of the voltage intermediate circuit capacitor connection points has an identical number of turn-off cross arm semiconductor switches, and at least two of the turn-off cross arm semiconductor switches in a cross arm are anti-serially connected.

5. The circuit of claim 4, wherein the turn-off semiconductor switches of each converter valve and the turn-off semiconductor switches of each cross arm are arranged side-by-side in a corresponding compression assembly in such a way that the valve connection points and the capacitor connection points are each located on a different side of the compression assembly.

6. The circuit of claim 4, wherein the turn-off semiconductor switches comprise Insulated Gate Bipolar Transistors (IGBT).

* * * * *